(12) United States Patent
Matsuo

(10) Patent No.: US 6,831,752 B1
(45) Date of Patent: Dec. 14, 2004

(54) SETTING METHOD FOR DEVICE DRIVER

(75) Inventor: Satoshi Matsuo, Otsu (JP)

(73) Assignee: Minolta Co., Ltd., Osaka (JP)

( * ) Notice: Subject to any disclaimer, the term of this patent is extended or adjusted under 35 U.S.C. 154(b) by 783 days.

(21) Appl. No.: 09/610,655

(22) Filed: Jul. 5, 2000

(30) Foreign Application Priority Data

Jul. 7, 1999 (JP) ............................................ 11-193051

(51) Int. Cl.⁷ ...................................... G06K 15/00
(52) U.S. Cl. ..................................... 358/1.13; 358/1.18
(58) Field of Search ................................. 358/1.1, 1.12, 358/1.13, 1.6, 1.16, 403, 444, 449, 1.18; 345/700, 866, 707, 714, 721, 733, 735, 744, 745, 788–789

(56) References Cited

U.S. PATENT DOCUMENTS 5,327,526 A * 7/1994 Nomura et al. ............ 358/1.16

FOREIGN PATENT DOCUMENTS

| JP | 8-147118 | 6/1996 |
|---|---|---|
| JP | 11-143664 | 5/1999 |

* cited by examiner

Primary Examiner—Arthur G. Evans
(74) Attorney, Agent, or Firm—McDermott Will & Emery LLP (57) ABSTRACT

The purpose of the invention is to provide a disk driver which makes it easy for users to set the settings. In a device driver which operates in the computer and has a function where each item of the device is set, when the arrangement information stored in the memory corresponding to a user is read in, the screen shows a display in accordance with it. In the arrangement settings, the user can freely arrange each of the setting items on the screen. Then the arrangement information is maintained in the computer together with the user information.

7 Claims, 12 Drawing Sheets

SETTING METHOD FOR DEVICE DRIVER

This application is based on application No. 11-193051 filed in Japan, the content of which is hereby incorporated by reference.

BACKGROUND OF THE INVENTION

1. Field of the Invention

The present invention relates to an interface of a device connected to a computer.

2. Description of the Related Art

When a device is connected to a computer that computer is provided with a program (driver) which is an interface for using the device. When using the device the driver is called up to operate the device. For example, when a printer is considered as the device in the case where printing is performed by the printer, the user opens the printer driver to carry out a variety of settings whenever the printing is performed.

For example, when a printer is considered which is connectable to the network as the device, in the case where the printing is performed by the printer, the user opens the printer driver to carry out a variety of settings whenever the printing is performed. In many cases, however, the setting items are spread across a plurality of pages of the driver and the same setting items are used repetitively. The user, however, cannot change the page layout of the setting items.

Conventionally, devices have existed which have functions for performing rearrangement of the menu of the driver on the operation panel of the device. In this method, however, only one arrangement can be maintained for one device. In addition, the user has to directly operate the device.

SUMMARY OF THE INVENTION

A purpose of the present invention is to provide a device driver which makes it easy for the user to change the settings.

In the setting method for the device driver according to the present invention, a setting method for a device driver, for example, a printer driver, for a device connected to a computer, which operates on the computer and which has a function where a user inputs settings among plurality of setting items, the setting method comprises steps of: accepting an instruction of a user with respect to arrangement of the setting items displayed on a window of the device driver; and storing an arrangement information representing an arrangement of the setting items on the window in a recording media and a user information.

In addition, a recording media, according to the present invention, recording a computer program readable by a computer for a device connected to a computer, which operates on the computer and which has a function where a user inputs settings among plurality of setting items, wherein the program comprises steps of: accepting an instruction of a user with respect to arrangement of the setting items displayed on a window of the device driver; and storing an arrangement information representing an arrangement of the setting items on the window in a recording media and a user information.

BRIEF DESCRIPTIONS OF THE DRAWINGS

These and other objects and features of this invention will become dear from the following description, taken in conjunction with the preferred embodiments with reference to the accompanied drawings in which.

DETAILED DESCRIPTION OF THE PREFERRED EMBODIMENTS

The embodiments of the present invention are described in reference to the attached drawings in the following. In the drawings the same numerals refer to the same or the equivalent referents.

Figure 1:
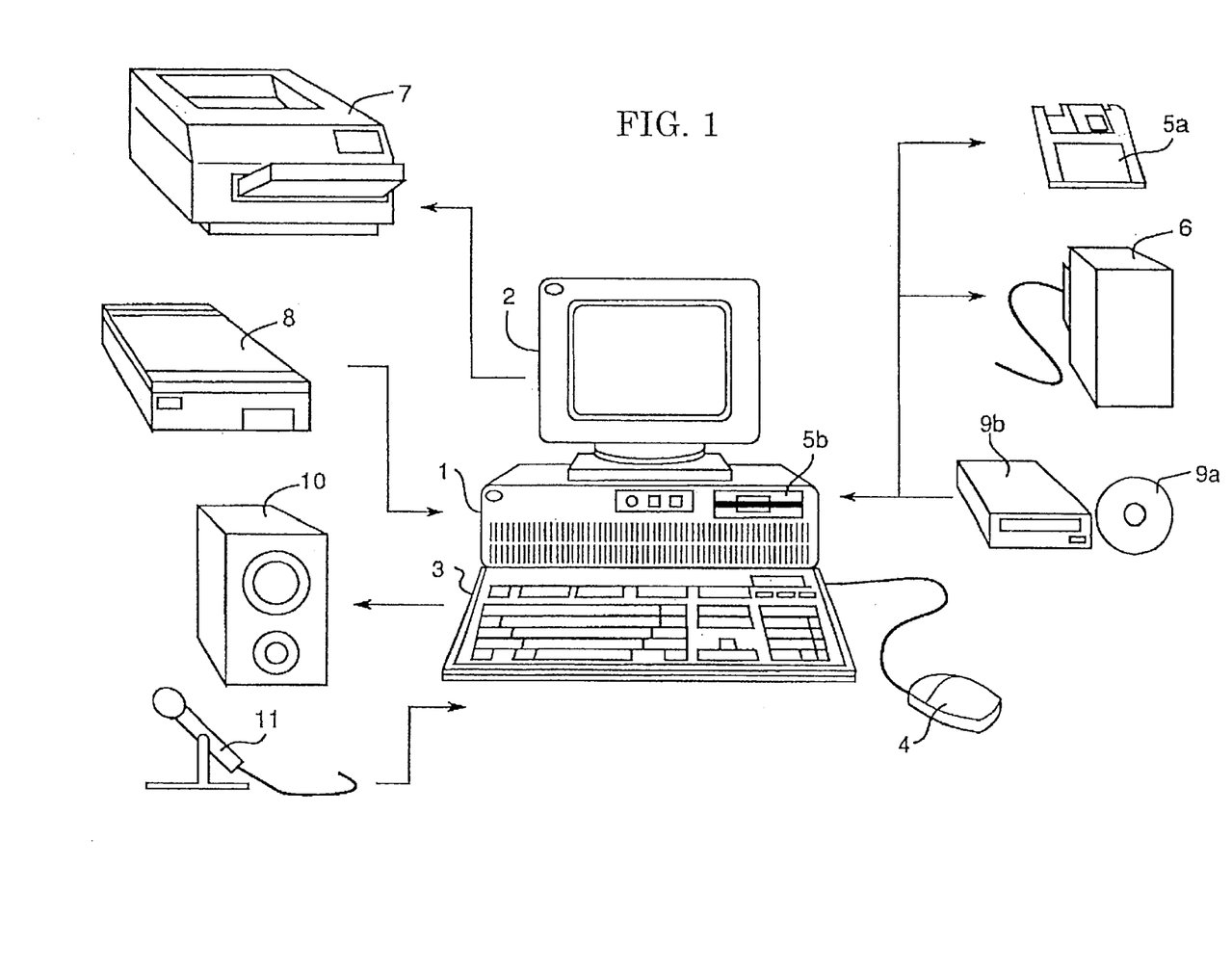
FIG. 1 is a view showing the entire configuration of the system.

An information processing system (hereinafter referred to as a system) of one embodiment according to the present invention is configured of a computer 1 as the center, which is provided with a central processing unit CPU as shown in FIG. 1, which controls the entire system. A display 2 displays images, letters or the like and displays a variety of screens for the operation. A keyboard 3 and a mouse 4 perform a variety of inputs and instruction operations. A floppy disk 5 and a hard disk 6 are recording media, respectively, for storing a variety of data. A printer 7 prints the letter data or the like on sheets of paper. A scanner 8 reads out image data from transcripts. A CD-ROM 9 stores a large amount of varieties of data. A speaker 10 for outputting speech sound and a microphone 11 for inputting speech sound are connected. Though in this system, the floppy disk 5 and the hard disk 6 are used as data storage media, other information recording media such as an MO may be used.

Figure 2:
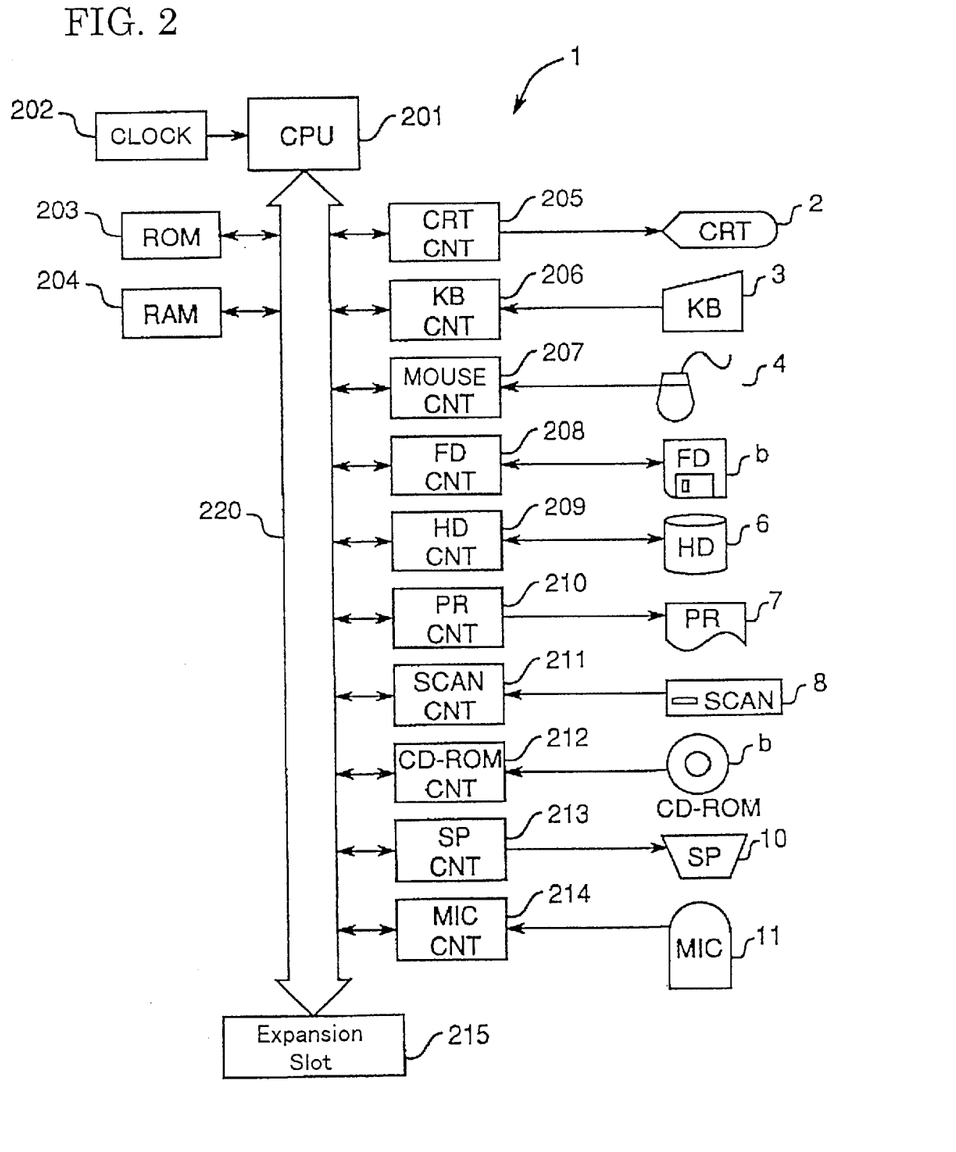
FIG. 2 is a block diagram showing the control unit as the center.

FIG. 2 is a block diagram of the system shown in FIG. 1. In the computer 1 the central processing unit CPU 201, a dock output unit 202, a ROM 203 and a RAM 204 as memories, and an expansion slot 215 are provided. And a bus 220 is provided between the CPU 201 and the expansion slot 215. Controllers 205 to 214 are provided for controlling, respectively, the peripheral apparatuses 2 to 11 connected to the computer. Each of those controllers and the above described ROM and RAM are connected to the bus 220.

A device driver is incorporated in the computer 1 for the device recognized by the computer. In the device driver, a variety of items which are necessary for the operation of the device are able to be set. The user can set the variety of items by opening windows of the device driver on the screen of the display 2. The setting information is stored in the computer for each user, therefore, a plurality of sets of settings can be stored in one device, of which a desired set of the settings can be selected. In the following the case is described where the device is a printer which is connectable to the network and the device driver is specified as a printer driver.

In the computer 1 a printer driver for the printer 7 is incorporated. This printer driver has a function where a variety of settings for the printer 7 are carried out on the driver screen. The driver screen comprises a plurality of pages. Some setting items are changed frequently such as paper settings and other setting items are rarely changed after once being set such as port settings or sharing settings.

Here the user can freely arrange each of the setting items on the driver screen and the information of the arrangement set by the user (page layout of the setting items) is maintained in the computer 1 together with the user information. Then, the arrangement information corresponding to the user is read in so as to be changed into that arrangement.

Figure 3:
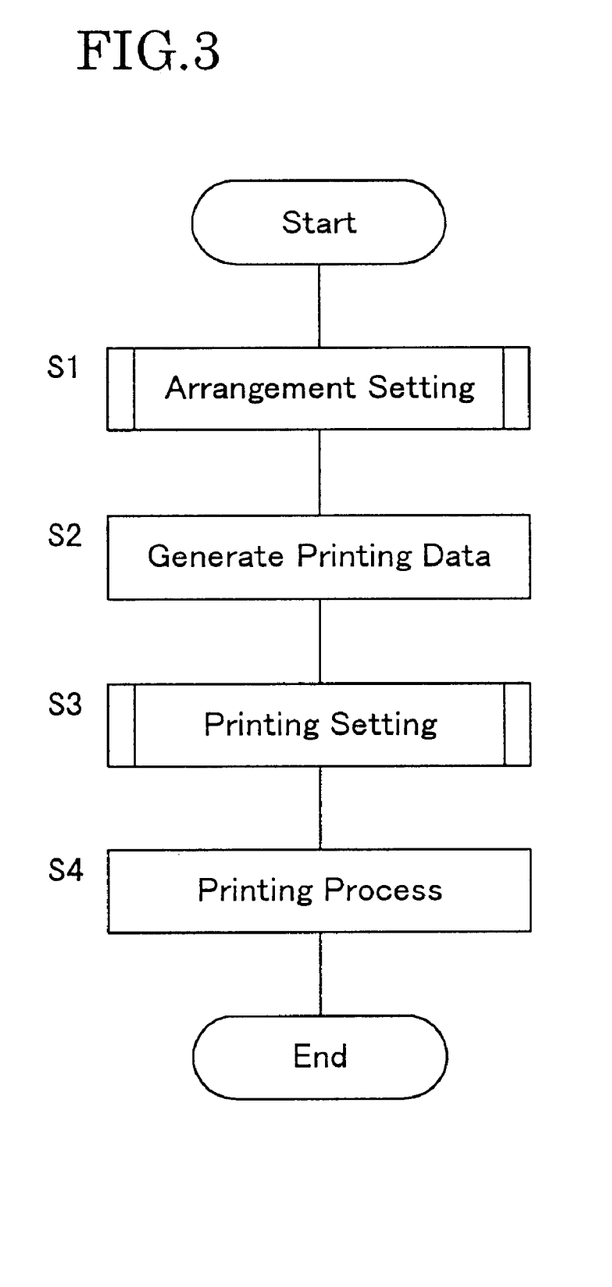
FIG. 3 is a flow chart of the main routine for the printer driver.

FIG. 3 shows a main routine representing a series of operations from the setting in this printer driver to the printing. First, in step S1, the user carries out the arrangement settings of the driver screen (see FIG. 4). Next, in step S2, each of the applications is used to generate printing data. Next, in step S3, the printing settings are carried out on the driver screen set in step S1 by the user. Next, in step S4 the printing processing is performed.

Figure 11:
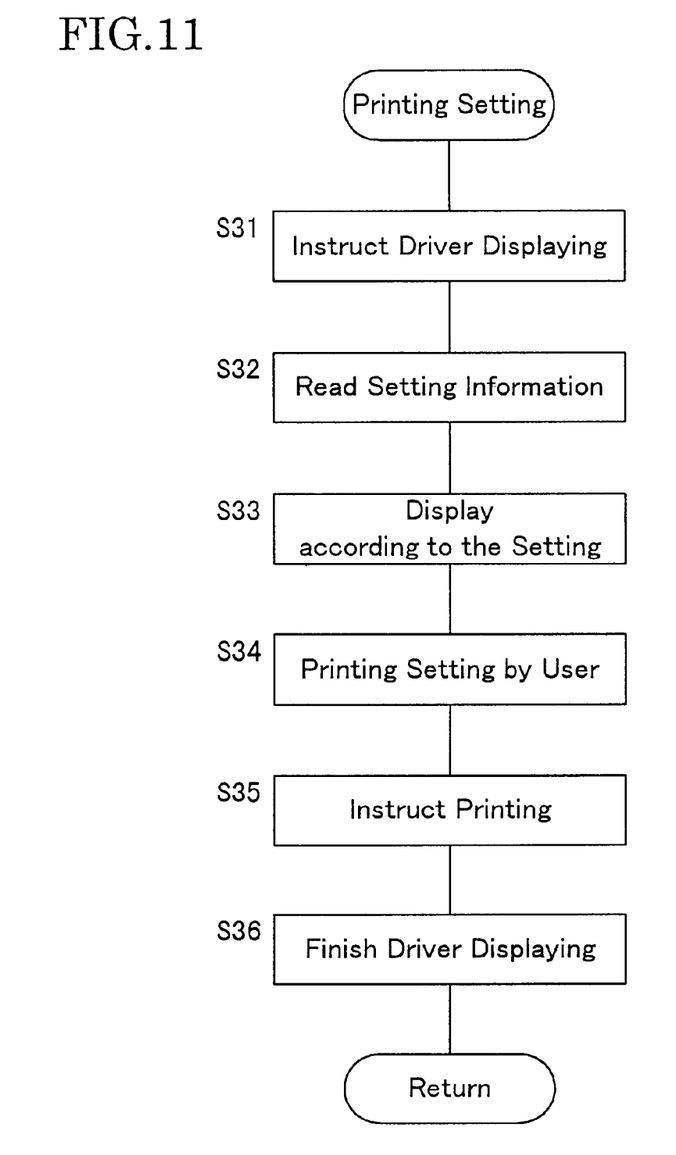
FIG. 11 is a flow chart of the subroutine for the printing settings.

FIG. 11 shows the flow of the printing settings (FIG. 3, S3). In step S31, the driver display instructions are carried out from an application, and in step S32, the driver display information registered from the present user information is read in to carry out the screen display according to the settings in step S33. In step S34 the user carries out the printing settings and in step S35 the user carries out the printing instructions.

Figure 4:
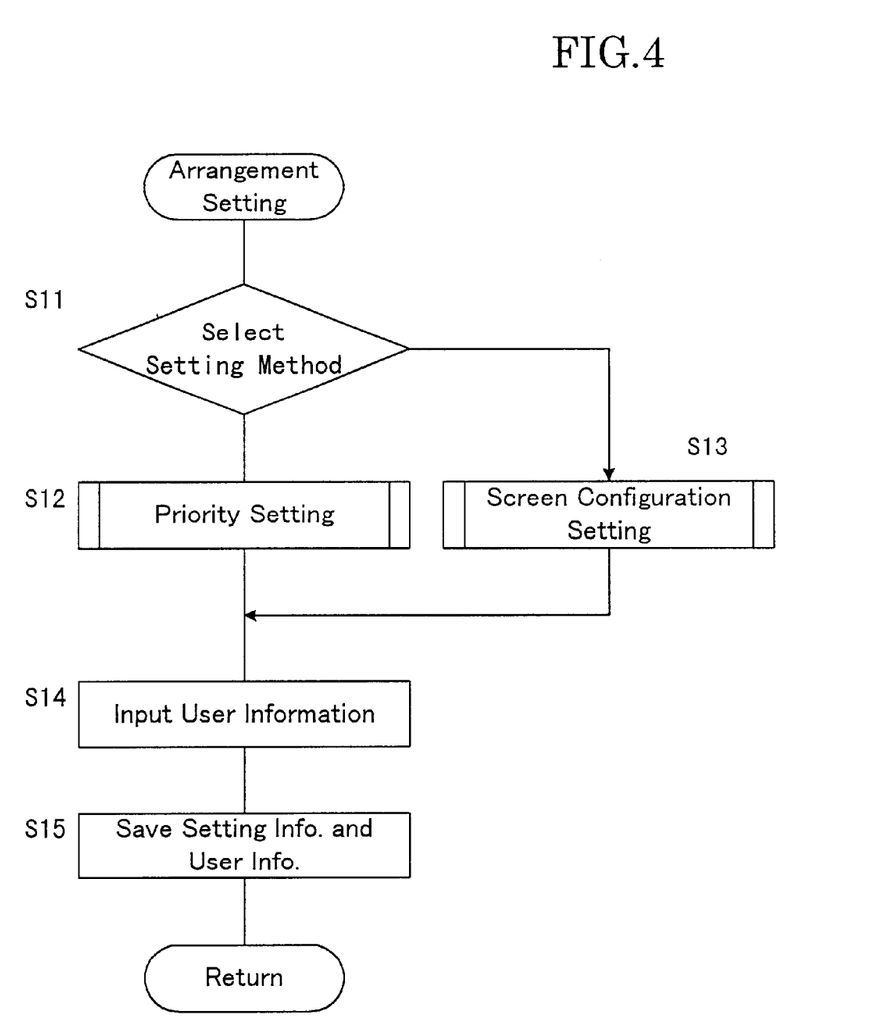
FIG. 4 is a flow chart of the subroutine for the arrangement settings.

FIG. 4 shows a flow chart of the arrangement setting subroutine shown in step S1 of FIG. 3. Here, the user can freely arrange each of the setting items on arbitrary pages manually or automatically. As one method, the arrangement can be set corresponding to the priority set by the user or, as another method, the arrangement can be set according to the arrangement positions set by the user. The user can carry out the change of the arrangement of the setting items by either method. In any setting, the user can set the On/Off of the display of the arrangement items. The screen setting information maintained, ultimately, is a page configuration, arrangement positions and display the On/Off settings, which are the same in either setting method. Here, the page configuration is the information of the item contents arranged on the page and the arrangement positions are the order information of the items arranged within the page and the display On/Off settings are the information whether or not the items are displayed on the screen.

First, in step S11 the user selects the setting method. That is to say, either the priority settings or the screen configuration settings are selected. The method of selection is that, for example, buttons of "priority settings" and "screen configuration settings" are provided as shown in FIGS. 7 to 10 so that only one can be selected. When the priority settings are selected, the user can set the priority of the order for displaying the setting items in step S12 (see FIG. 5).

Figure 6:
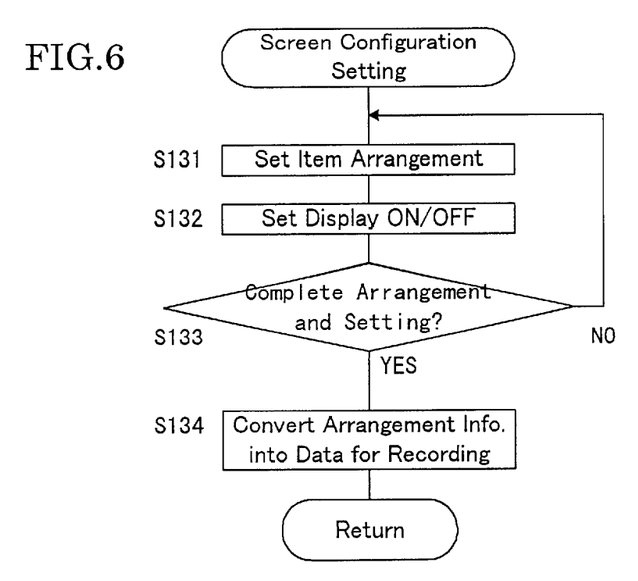
FIG. 6 is a flow chart of the subroutine for the display configuration settings.

When the screen configuration settings are selected, the user can set the arrangement (screen configuration) of the items within the screen (within the window of the printer driver) in step S13 (see FIG. 6). Next, in step S14, the user inputs the information of the user who carries out the settings (for example, a user ID, a user name, the setting names or the like) as information for managing the setting information. Finally, in step S15, the above described screen setting information (page configurations, arrangement positions and display On/Off settings) and the user information are, together, maintained in the computer 1. Accordingly, the arrangement information corresponding to the user is read in and the arrangement of the setting items on the screen is changed. And the user can freely or automatically customize the arrangement of the setting item contents. In addition, since each piece of setting information is maintained on the computer, a plurality of sets of settings can be maintained for one device so that a desired set of the settings can be selected. Therefore, the settings can be registered for a plurality of users or a plurality of sets of settings can be registered by one user.

Figure 5:
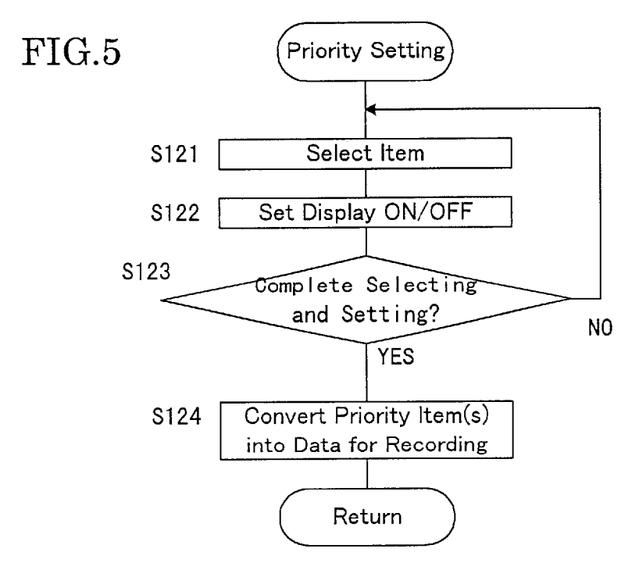
FIG. 5 is a flow chart of the subroutine for the priority settings.
Figure 7:
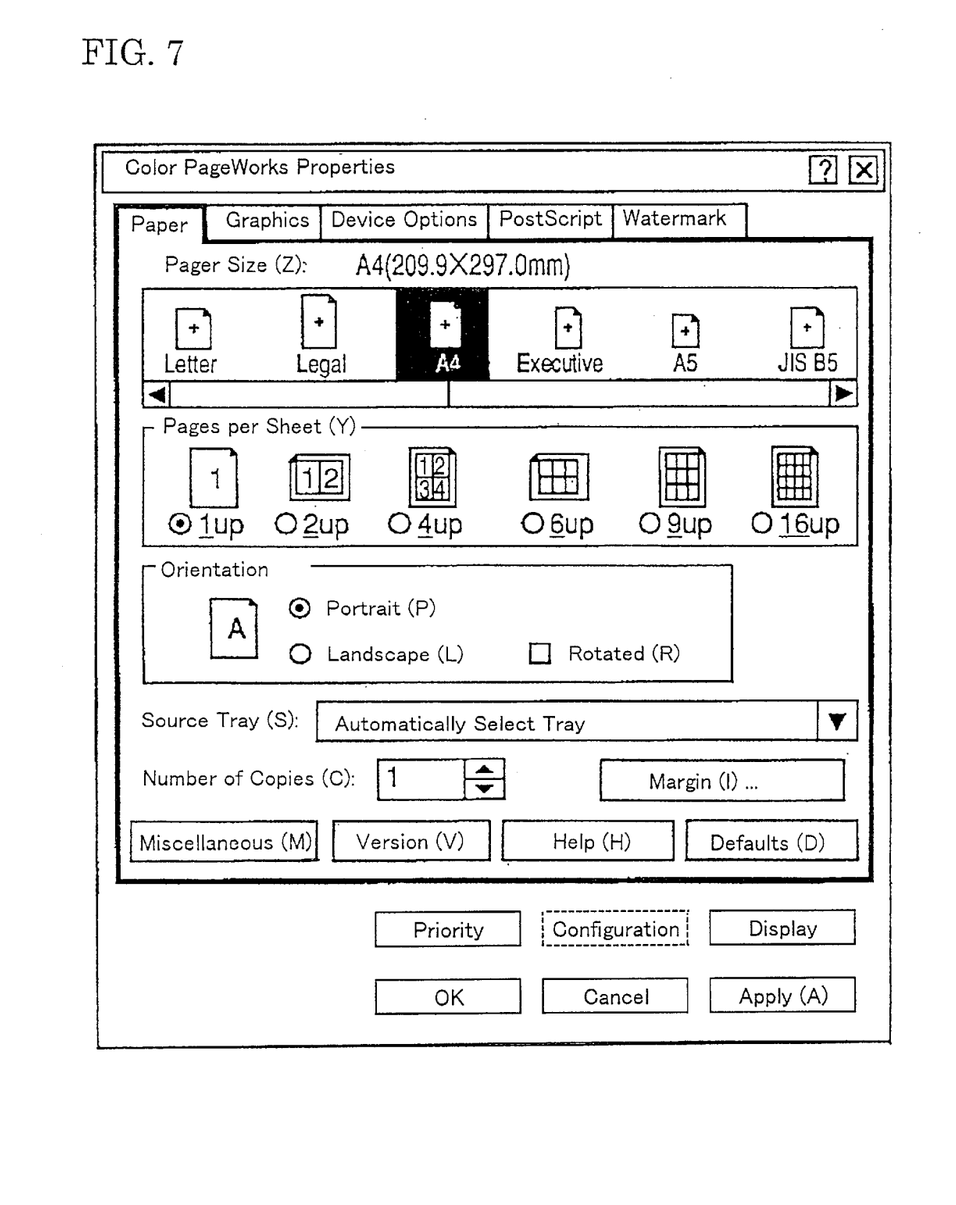
FIG. 7 is a view showing a driver screen before the user sets the priority.

FIG. 5 shows a flow chart of the priority settings shown is step S12 of FIG. 4. Here, the user can set the priority of the order for displaying the items. First, in step S121, the user selects the items wished to be displayed with a priority. FIG. 7 is shown as a display example. Here, a paper tag is selected. A list of setting items with respect to paper is displayed on the screen, in which a priority is given in the order selected by the user. The selection is performed by clicking the priority button after selecting the item. In the case that a plurality of items are selected the same number of operations as the items are repeated in the order of high priority. The items selected here are displayed in order from the lead on the driver screen. Next, in step S122, the user carries out the settings whether or not the items are displayed (display mode). In doing so, Displayed/Not Displayed can be switched by selecting the items and by clicking the display buttons. The items which are not displayed may be, for example, a gray display on this screen. Here, the items set as not displayed (display off) are not displayed on the driver screen. Next, in step S123, the user confirms whether all the items displayed with priority have been selected. When the completion of the selection is confirmed the priority items are converted into data to be stored in the memory in step S124. Thereby, the arrangement information of the setting items (positions and dimensions on the screen based on the priority information, page information, display mode or the like) are stored in the memory.

In this embodiment, the priority settings are designated by the user. Other than the designation by the user, however, automatic counting of the numbers of changes of the contents of each item by the user in the printing settings at the time of the printing (step S34 of FIG. 11) and arrangement of the items, in the order of most used to least used, may be carried out solely or together with the user designation. Thereby, the setting items can be arranged automatically in the order of user usage frequency from the highest to the lowest.

FIG. 6 shows a flow chart of the screen configuration settings (FIG. 4, S13). Here, the user can directly change or set the arrangement within the screen (screen configuration). First, in step S131, the user sets the item arrangement on the driver screen by dragging and dropping. Here, the layout can be changed or set so that, for example, a plurality of items represented in a plurality of pages with high usage frequency are displayed within one page. More concretely, parts of the items can be dragged to be moved to the targeted positions with a pointing device such as a mouse to be dropped so as to change the display positions. Next, in step S132, the user sets whether or not the items are displayed. This can be achieved by switching Displayed/Not Displayed after selecting the items and clicking the display buttons in the same way as in the above described step S122. The items which are not displayed may be, for example, a gray display on this screen. Here, the items set as Not Displayed (Of) are not displayed on the driver screen. Thereby, the user can change the arrangement of the setting items arbitrarily while confirming the positional relationships among the actually arranged items. Next, in step S133, the user confirms whether the settings are completed. When completed the screen arrangement is converted into data to be stored into memory in step S134. Thereby, the arrangement information of the setting items (positions and dimensions of the arranged screen, page information, display modes or the like) are stored in the memory.

In this embodiment, the case is described where the setting items are manually arranged on the screen by the user. Other than this, however, the above may be used together with the method where the number of the changes of the contents of each item by the user may be counted automatically for printing settings at the time of the printing (step S34 of FIG. 11) so that the arrangement items are arranged and displayed in the order from most used to least used. Thereby, the items are displayed automatically on the screen in the order from the highest usage frequency to the lowest usage frequency by the user.

Figure 8:
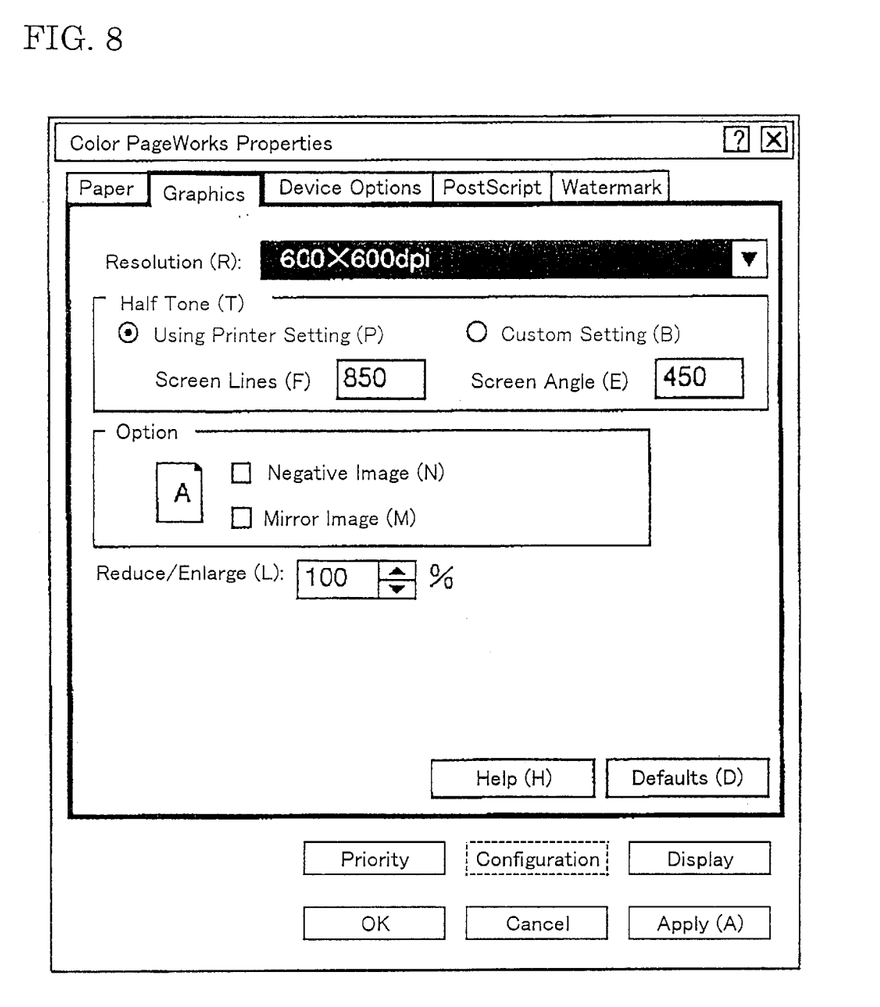
FIG. 8 is a view showing a driver screen before the user sets the priority.
Figure 9:
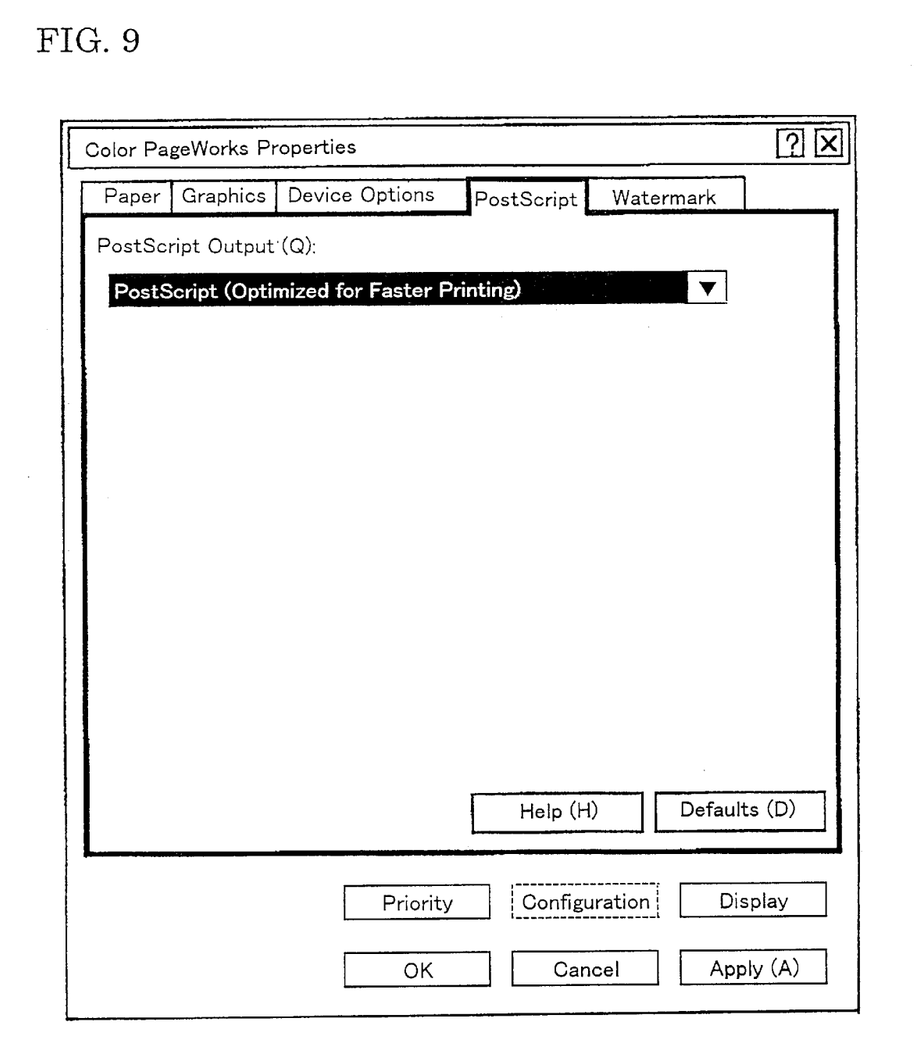
FIG. 9 is a view showing a driver screen before the user sets the priority.

FIGS. 7 to 10 show an example of the screen arrangement in the priority settings. The screen of the display 2 shows the original driver screen before changing. Tabs for paper, graphics or the like correspond to pages. On the screen where the driver screen is displayed, a button for priority settings are arranged so that by selecting the item when shown with an outlined character on a colored background followed by pressing the priority setting button, the priority is set for the item. The conditions shown in FIGS. 7 to 9 are the conditions allowing the priority settings, therefore, the button for the screen configuration is in the non-selectable condition. In this way the priority can be set in order. Finally, by pressing the priority settings completion button (OK button) the priority settings are completed.

Figure 12:
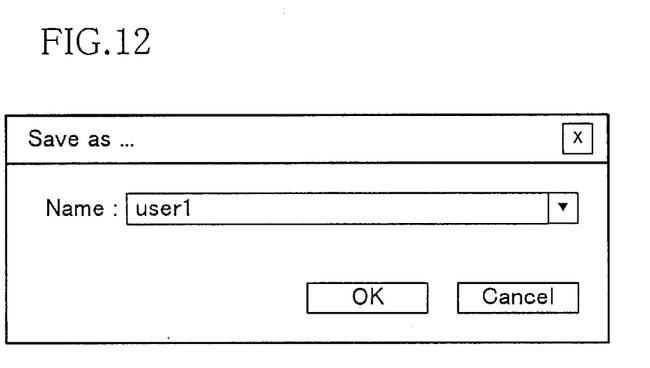
FIG. 12 is a view showing an example of a dialog box where the user information is entered.

More concretely, as shown in FIG. 7, the page of the paper tab is displayed at first. Here, the item of paper size is selected and the priority setting button is pressed, then the paper size is set as the item of first priority. Next, the orientation of the printing is set in the same way so as to be set as an item of second priority. Next, the paper feeding method, source tray in FIG. 7, is set in the same way so as to be set as the item of third priority. Next, the number of copies is set in the same way so as to be set as the item of fourth priority. Next, as shown in FIG. 8, the page of the graphics tab is displayed. Here, the resolution is set in the same way so as to be set as the item of fifth priority. Next, as shown in FIG. 9, the page of PostScript tab is displayed. Here, the PostScript output format is set in the same way so as to be set as the item of sixth priority. The settings of whether or not the items are displayed are carried out in a cyclical way of switching between displayed or not displayed by selecting the item and by pressing the display button. Here, when the settings of the priority are completed, a dialog box for inputting the user information is displayed as shown in FIG. 12. Here, the user ID, the user name, other settings under attached names and the like can be maintained.

Figure 10:
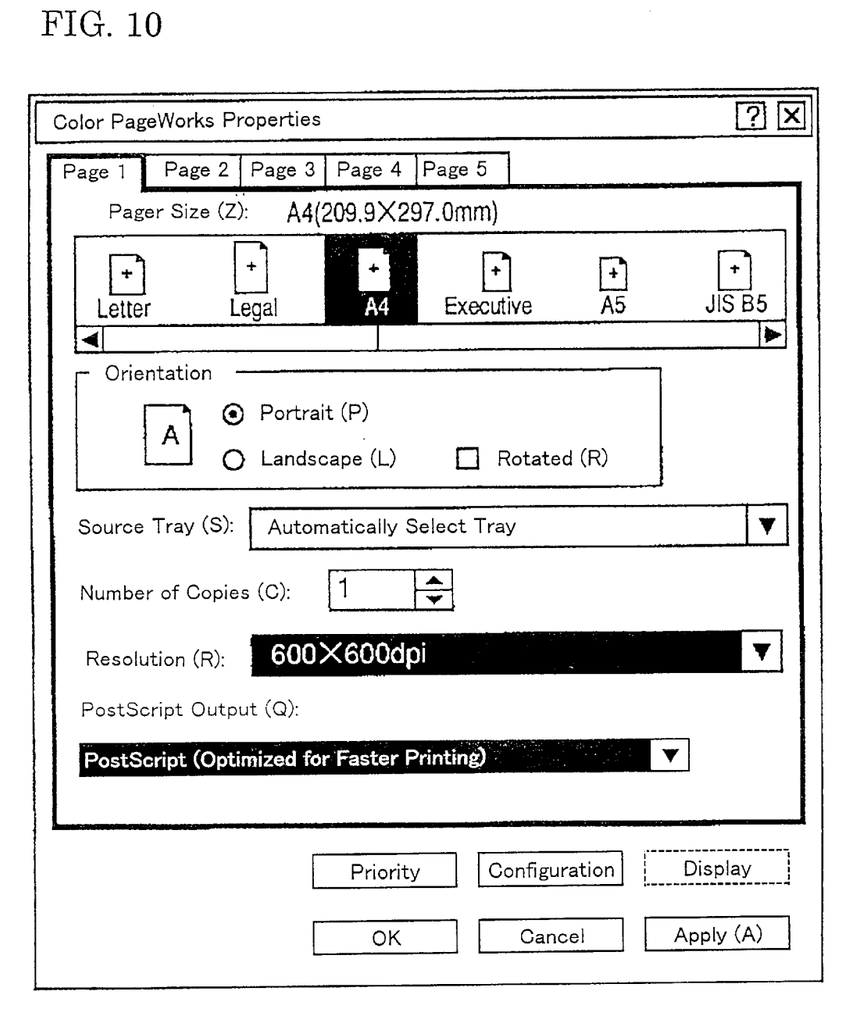
FIG. 10 is a view showing a driver screen gained according to the priority of the arrangement set by the user.

FIG. 10 shows a driver screen gained according to the priority of the arrangement set by the user. On page 1, each item of paper size, orientation of printings, paper feed method, number of copies, resolution, and PostScript output format is displayed in the order from priority 1 set in the above described contents. The remaining items of which the priority has not been set are displayed in the order of the default arrangement on the following pages. That is to say, the remaining items of the first page are arranged from the top to the bottom and this procedure is applied to the items of the following pages up to and including the last page.

In this condition, either the priority settings or the screen configuration settings are selectable. In the case that the user changes the arrangement positions manually, each of the setting items can be moved by dragging and dropping on the driver screen before changing through pressing the button for the arrangement position settings on the screen. Then the user can change the arrangement positions of each item manually. Finally, by pressing the arrangement settings completion button (OK button), the information about the driver screen designed in this way is stored in the memory. At this time, as shown in FIG. 12, a dialog box may be displayed for inputting registration names in the case when those settings are maintained.

Figure 13:
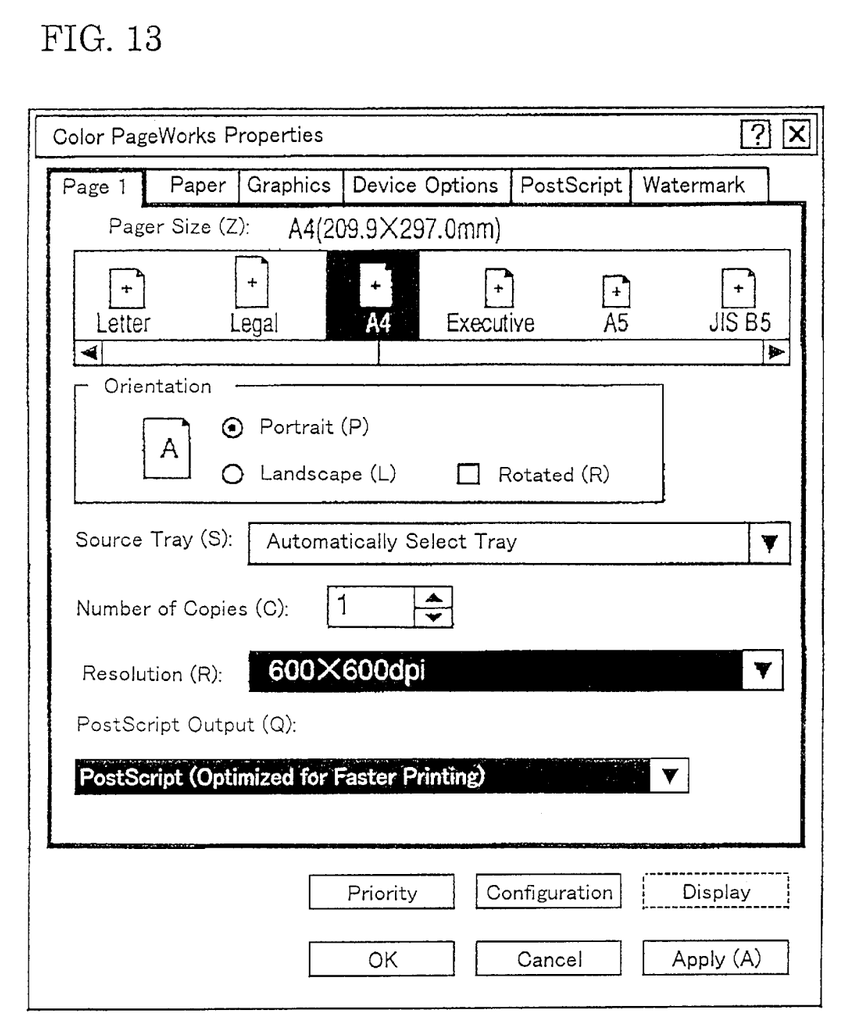
FIG. 13 is a view showing another embodiment of a screen configuration after the priority is set and customized.

Though an example is shown in FIG. 10 as an example of the driver screen gained according to the priority of the arrangement set by the user, the present invention is not limited to this. As a modification, an example is shown in FIG. 13. Though in this example, the aspect where the items with the priorities attached are arranged on the first page is the same as that of the example of FIG. 10, the differences are that the items of the other pages remain the same before changing. That is to say, on page 2 and after the same arrangement remains on pages 1 to 5 before changing. In such a configuration when items without the priority attached are searched it becomes easy to find on which page the desired items are located because each item is summarized on each page according to classification.

Figure 14:
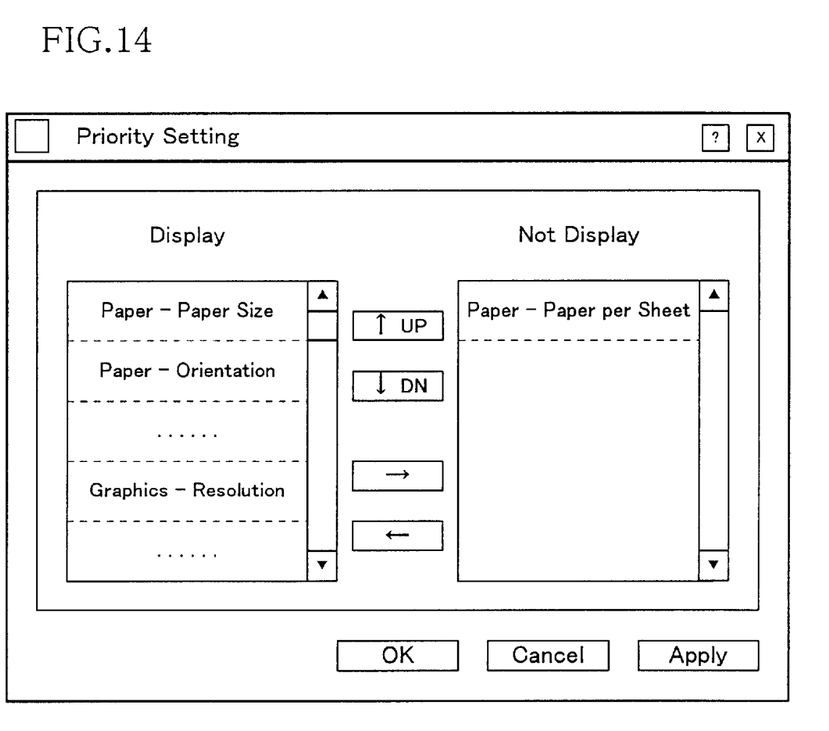
FIG. 14 is a view showing another embodiment of the processing for setting the priority.

Examples of the operations and screen displays for setting the priority are not limited the examples in FIGS. 7 to 9. A modification is shown in FIG. 14. In this example, when the priority setting mode is selected a screen displaying each item in a list is displayed as shown in FIG. 14. On this screen, the user can select an item within the list, utilizing an arrow button pointing up and down or left and right so as to change the order of the arrangement of each item and whether or not each item is displayed. When completing this screen, the user information is inputted as shown in FIG. 12 so as to store the user information and the arrangement information in the memory. Next, when the driver screen is displayed, the arrangement of each item is changed based on the contents stored in the memory in order to be displayed.

As described above, according to the above described configuration the user can freely arrange a variety of setting items on an arbitrary page manually or automatically on the computer screen, and in addition the arrangement information can be maintained in the computer. Since each piece of setting information is preserved in the computer, a plurality of sets of settings can be maintained for one device among which a desired set of the settings can be selected. Accordingly, one device driver can be utilized for the display following the desired contents set by each of a plurality of users. In addition, one user can register a plurality of sets of settings so as enable use according to varying situations.

Obviously, many modifications and variation of the present invention are possible in light of the above teachings. It is therefore to be understood that within the scope of the appended claims, the invention may be practiced other than as specifically described

What is claimed is:

1. A setting method for a device driver for a device connected to a computer, which operates on the computer and which has a function where a user inputs settings among plurality of setting items, the setting method comprising steps of:

accepting an instruction of a user with respect to arrangement of the setting items displayed on a window of the device driver; and storing an arrangement information representing an arrangement of the setting items on the window in a recording media and a user information.

2. A setting method as claimed in claim 1, wherein the instruction includes a priority of an arrangement of the setting items on the window, and the arrangement information includes the priority.

3. A setting method as claimed in claim 1, wherein the instruction includes an instruction representing a movement of display positions of the setting items on the window, and the arrangement information includes the display positions.

4. A setting method as claimed in claim 1, wherein the instruction includes a modification of order of setting items in a list, and the arrangement information represents the order of setting items in the list.

5. A setting method as claimed in claim 1, further comprising a step of displaying the setting items according to the arrangement information and the user information stored in the recording media.

6. A setting method as claimed in claim 1, wherein the storing step stores plurality of arrangement information and plurality of user information corresponding respectively.

7. A recording media recording a computer program readable by a computer, for a device connected to a computer, which operates on the computer and which has a function where a user inputs settings among plurality of setting items, wherein the program comprising steps of:

accepting an instruction of a user with respect to arrangement of the setting items displayed on a window of the device driver; and storing an arrangement information representing an arrangement of the setting items on the window in a recording media and a user information.

* * * * *